Patented Aug. 23, 1949

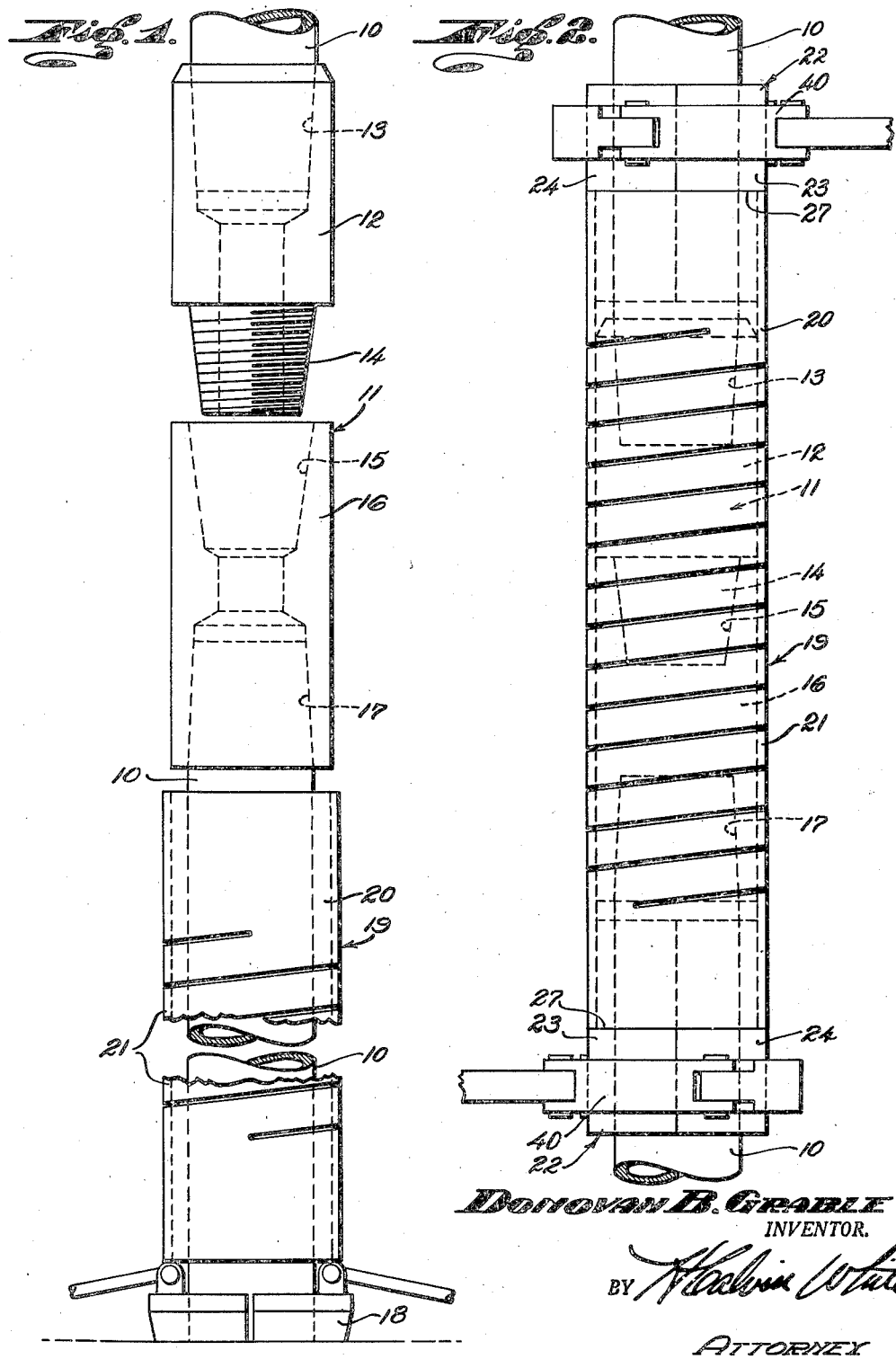

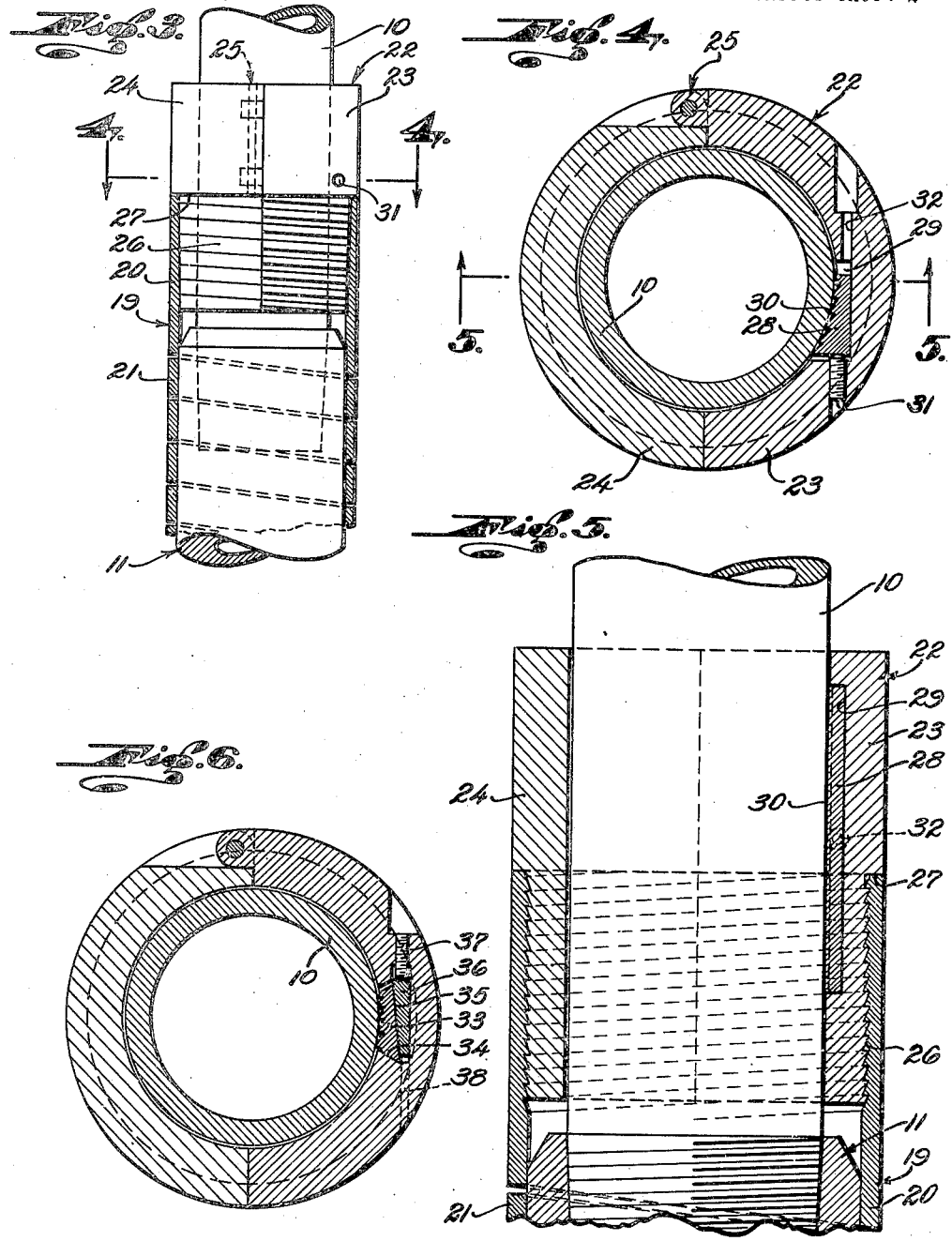

2,479,740

UNITED STATES PATENT OFFICE 2,479,740

PIPE-JOINT RETAINER

Donovan B. Grable, Long Beach, Calif.

Application August 25, 1947, Serial No. 770,384

17 Claims. (Cl. 285—146)

This invention has to do generally with the retention of threaded pipe joints against loosening or unthreading, and is concerned particularly with improvements in joints for pipe strings, especially well drill strings, by which rotary motion is transmitted from a power source to a tool carried by the string.

Considering for example a well drill pipe string, the latter customarily is employed to transmit clockwise or right hand rotation in normal operation of the tools. Accordingly the pipe sections of the string, as well as the pipe and intermediate or terminal tools, are connected by right hand thread joints. At times, operations may require rotation of the string and tools in an opposite direction, in which event it becomes necessary to first pull the string and replace the couplings with left hand thread joints, since it is unsafe to risk reverse rotation using right hand thread joints.

One of my major objects is to equip the conventional right hand thread joint in a manner assuring safety against its loosening or disengagement regardless of the direction of rotation and magnitude of the transmitted torque. While broadly the invention is applicable to any or all threaded joints in the entire string, i. e. rod or pipe sections and inclusive of tools, it has special practical advantage, and will be so described and illustrated, as applied to the conventional sectional tool joints interconnecting successive pipe stands or sections.

More particularly considered, the invention aims to incorporate in a joint assembly a retention means or attachment having the general functions of yieldably resisting loosening of the joint threads, and also of constantly urging the sections in thread tightening relation. Preferably such attachment has the general form of a coil spring sleeve applied about the joint and terminally connected to its sections. Provision is made to utilize the sleeve for the dual purposes of preventing both relative axial and rotational loosening movement of the joint sections, by wrapping the sleeve tightly about the joint before attachment to its sections, and in so doing, pretensioning the spring in a manner causing it to exert on the joint a constant tightening force.

The invention further contemplates various novel features with respect to the form of the spring sleeve and means for releasably attaching its end portions to the respective joint sections. Such features include the use of a spring sleeve formed by spirally cutting a pipe section, the insertion of removable split rings or bushings within the ends of the sleeve, and equipment of the rings with holding or gripping means releasably engageable with the joint sections.

The above indicated, as well as various additional features and objects of the invention will be fully understood from the following detailed description of the illustrative embodiments shown by the accompanying drawings, in which:

Fig. 1 is a general elevation illustrating the positioning of the spring sleeve in the course of making up a drill pipe tool joint;

Fig. 2 is a similar view illustrating the method of applying the sleeve to the joint;

Fig. 3 is a fragmentary sectional view showing one end of the sleeve with the split ring received therein;

Fig. 4 is an enlarged cross-section on line 4—4 of Fig. 3;

Fig. 5 is a fragmentary vertical section on line 5—5 of Fig. 4; and

Fig. 6 is a view similar to Fig. 4 showing a variational form of the invention.

Referring first to Fig. 1, the invention will be described typically as applied to a right hand thread connection between the drill pipe stands 10, in the form of a conventional tool joint generally indicated at 11. The joint consists of a section 12 having a threaded box 13 receiving the threaded end of the upper stand 10, and a pin 14 receivable within the threaded box 15 of section 16 having a second threaded box end 17 receiving the lower pipe stand. As will be understood, all the indicated joint parts have right hand threads. In the course of making up the drill string, its lower section carrying the coupling 16 is supported and held against rotation by the rotary table slips 18, and the pipe stand to be added is lowered to permit rotation of its pin 14 into the coupling.

The described retention of the joint assembly, once made up, against loosening or release in response to left hand torque, is effected by application to the joint assembly of a spring sleeve, generally indicated at 19, and terminally attached as will later be described, to the respective joint sections. In its preferred form, the sleeve 19 consists of an open tube section 20 spirally cut at a pitch having reverse relation to the thread pitch of the later described joints at 26, thus converting the intermediate section of sleeve to a coil spring 21 which, after attachment to the joint sections, tends to wind and assume tension in response to loosening of any of the joint threads. The internal diameter of the sleeve 19 preferably is just sufficiently larger than the outside diameter of the coupling 16 to permit the sleeve to be slipped down over and past the coupling with ease to the position shown in Fig. 1.

After the tool joint sections 12 and 16 are made up and tightened by the tongs to the condition illustrated in Fig. 2, sleeve 19 then is raised to a position permitting attachment of its end portions to the pipe stands 10 above and below the tool joint. Such attachment is effected by the split ring or bushing inserts particularly illustrated in Figs. 3 to 6. Each attachment may comprise a split ring assembly 22 including a pair of semi-circular sections 23 and 24 interconnected by a hinge at 25. The ring assembly has an inner left hand thread portion 26 adapted to be screwed into the correspondingly threaded bore of the sleeve to the point of engagement of the ring shoulder 27 with the end of the sleeve.

Each ring assembly 22 carries or contains means for releasably retaining the ring, and therefore the associated end of the sleeve 20, against rotation relative to the pipe 10 in a direction tending to permit loosening of the pretensioned spring 21. Referring to Fig. 4, such holding means typically may comprise a toothed gripping element 28 contained and movable laterally of the pipe within a recess 29 in one of the ring sections, the toothed face 30 of the element being curved or wedge-shaped so that it will securely grip the pipe when forced against it by tightening the set screw 31. The element 28 may be released from gripping engagement with the pipe by means of a pin thrust through an opposite alined opening 32 in the ring. Fig. 6 illustrates a preferred and wedge-actuated holding means comprising a toothed gripping element 33 retained within recess 34 and having an angular face 35 engaged by the wedge 36. Advancement of the wedge by rotation of set screw 37 forces the element 33 radially inward into tight gripping engagement with the pipe 10. Retraction of the wedge 36 may be permitted simply by loosening the screw 37, with or without other influence, as by a pin thrust through hole 38.

In further considering the method of attachment of the spring sleeve to the joint, assume again the sleeve to be positioned as in Fig. 2, and the split ring assembly 22 to be screwed into the sleeve ends as shown in Fig. 3. By application of tongs 40 to the exposed faces of the rings, the spring 21 may be wound up to a degree bringing it into tight engagement with the surfaces of the coupling sections 12 and 16. As a result of its winding, the spring is placed in a pretensioned condition of tight confinement about the joint, in which the spring or sleeve is locked by thrusting the gripping elements 28 or 33 into retaining engagement with the pipe. From the foregoing, it will be understood that the pretensioning of the spring sleeve locks the joint threads against loosening in two respects: First, the tightly wrapped condition of the sleeve about the joint sections and its connections with the pipe stands, resists any tendency for axial parting movement of the joint sections, and second any tendency of the section to rotate in a thread loosening direction is immediately resisted by the tendency of the attached spring sleeve to wind further and assume greater tension, the spring being particularly effective in this respect by reason of its pretensioned condition and constant tendency to exert tightening rotation of the joint parts.

In contrast with the conventional practice and necessity of having to equip a drill string normally having right hand thread joints, with left hand thread joints where operations necessitate reverse rotation of the string, the invention makes possible the continued use of the same drill string and its couplings, by the simple expedient of applying to its joints the described retaining spring sleeve.

I claim:

1. A pipe string joint comprising a pair of sections having engaged threads, a coil spring sleeve surrounding and terminally connected to the sections and resisting relative movement thereof in a thread loosening direction, and wedge elements releasably attaching the end portions of the sleeve to said sections.

2. A pipe string joint comprising a pair of sections having engaged threads, a coil spring sleeve surrounding and terminally connected to the sections and resisting relative movement thereof in a thread loosening direction, and members received within the end portions of said sleeve to engage said sections and concentrically space the sleeve therefrom.

3. A pipe string joint comprising a pair of sections having engaged threads, a coil spring sleeve surrounding and terminally connected to the sections and resisting relative movement thereof in a thread loosening direction, and split members threaded into the end portions of the sleeve and engaging said sections.

4. A pipe string joint comprising a pair of sections having engaged threads, a coil spring sleeve surrounding and terminally connected to the sections and resisting relative movement thereof in a thread loosening direction, split members threaded into the end portions of the sleeve and engaging said sections, and means releasably connecting said members to the sections.

5. The combination comprising a well pipe string including a pair of pipe lengths, a tool joint comprising engaged threaded pin and box sections, a coil spring sleeve tightly wrapped about said sections and thereby pretensioned to constantly urge the sections in a thread tightening direction, and means within the end portions of the sleeve releasably securing said end portions to said pipe lengths against tension releasing rotation.

6. The combination comprising a well pipe string including a pair of pipe lengths, a tool joint comprising engaged threaded pin and box sections, a coil spring sleeve tightly wrapped about said sections and thereby pretensioned to constantly urge the sections in a thread tightening direction, split rings threaded into the end portions of the sleeve, and means releasably securing said rings to said pipe lengths against rotation tending to loosen the spring sleeve tension.

7. The combination comprising a well pipe string including a pair of pipe lengths, a tool joint comprising engaged threaded pin and box sections, a coil spring sleeve tightly wrapped about said sections and thereby pretensioned to constantly urge the sections in a thread tightening direction, split rings threaded into the end portions of the sleeve, and wedge elements carried by said rings and releasably engageable with said pipe lengths to secure the rings against rotation tending to loosen the spring sleeve tension.

8. A pipe string joint comprising a pair of tubular sections having engaged threads connecting adjacent ends of the sections, and a spring connecting the sections and engaging the outer surfaces thereof beyond said ends, said spring resisting relative movement of the sections in a thread loosening direction.

9. A pipe string joint comprising a pair of tubular sections having engaged threads connecting adjacent ends of the sections, and a spiral spring connecting the sections and engaging the outer surfaces thereof beyond said ends, said spring resisting relative rotational movement of the sections in a thread loosening direction.

10. A pipe string joint comprising a pair of tubular sections having engaged threads connecting adjacent ends of the sections, and a pretensioned spiral spring connecting the sections and tightly engaged about and against the outer surfaces thereof beyond said ends, said spring resisting relative movement of the sections in a thread loosening direction.

11. A pipe string joint comprising a pair of tubular joint sections connected to a pair of smaller diameter pipe lengths and having engaged threads connecting adjacent ends of the sections, a spiral spring extending longitudinally about the outer surfaces of both said sections, and means connecting said spring to said pipe lengths.

12. A pipe string joint comprising a pair of tubular sections having engaged threads connecting adjacent ends of the sections, and a spring formed of a spirally slotted cylindrical tube connecting the sections and engaging the outer surfaces thereof beyond said ends, said spring resisting relative movement of the sections in a thread loosening direction.

13. A well pipe tool joint comprising a pair of engaged threaded pin and box sections having longitudinally alined substantially cylindrical outer surfaces, and a spiral spring connecting the sections and engaged about and against said surfaces of both sections, said spring resisting relative movement of the sections in a thread loosening direction.

14. A well pipe tool joint comprising a pair of engaged threaded pin and box sections having longitudinally alined substantially cylindrical outer surfaces, and a pretensioned spiral spring connecting the sections and tightly engaged about and against said surfaces of both sections, said spring resisting relative movement of the sections in a thread loosening direction, by virtue of both the torsional resistance of the spring and its tight frictional engagement with both of said surfaces.

15. A well pipe joint comprising three directly successive tubular sections having engaged threads connecting the sections, and a spring connecting the end sections and resisting relative movement of the sections in a thread loosening direction.

16. A well pipe joint comprising three directly successive tubular sections having engaged threads connecting the sections, and a spiral spring sleeve engaging the outer surfaces of the sections and connected to the end sections, said spring resisting relative rotation of the sections in a thread loosening direction.

17. A well pipe joint comprising three directly successive tubular sections having engaged threads connecting the sections, a spiral spring sleeve engaging the outer surfaces of the sections and connected to the end sections, said spring resisting relative rotation of the sections in a thread loosening direction, reduced diameter pipe lengths connected to the end section, and means within the end portions of said spring sleeve connecting the sleeve to said pipe lengths.

DONOVAN B. GRABLE.

REFERENCES CITED

The following references are of record in the file of this patent:

UNITED STATES PATENTS

| Number | Name | Date |
|---|---|---|
| 1,385,178 | Levedahl | July 19, 1921 |
| 1,579,648 | Crickmer | Apr. 6, 1926 |
| 2,176,504 | McLaughlin | Oct. 17, 1939 |
| 2,355,166 | Johanson | Aug. 8, 1944 |